UNITED STATES PATENT OFFICE.

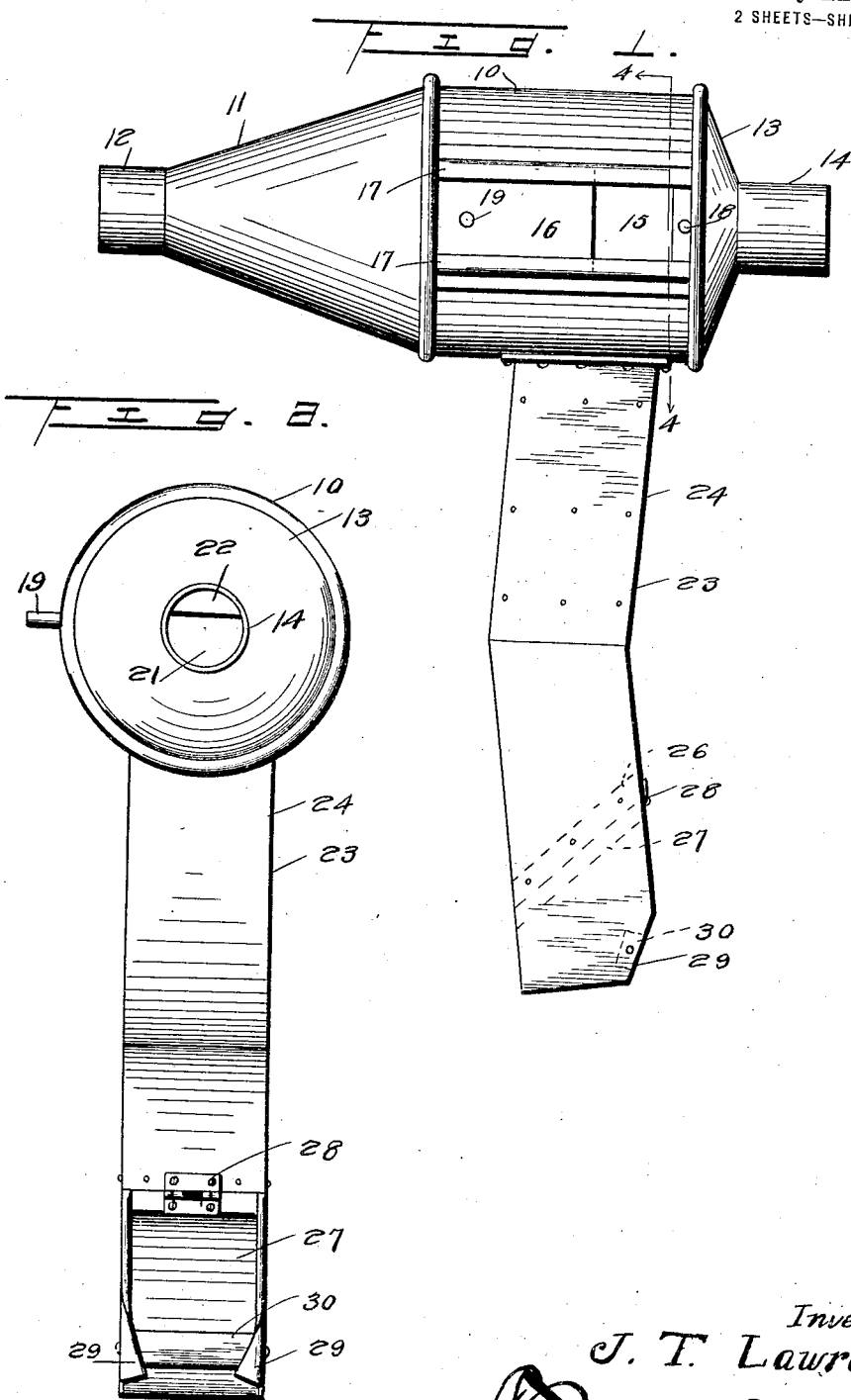

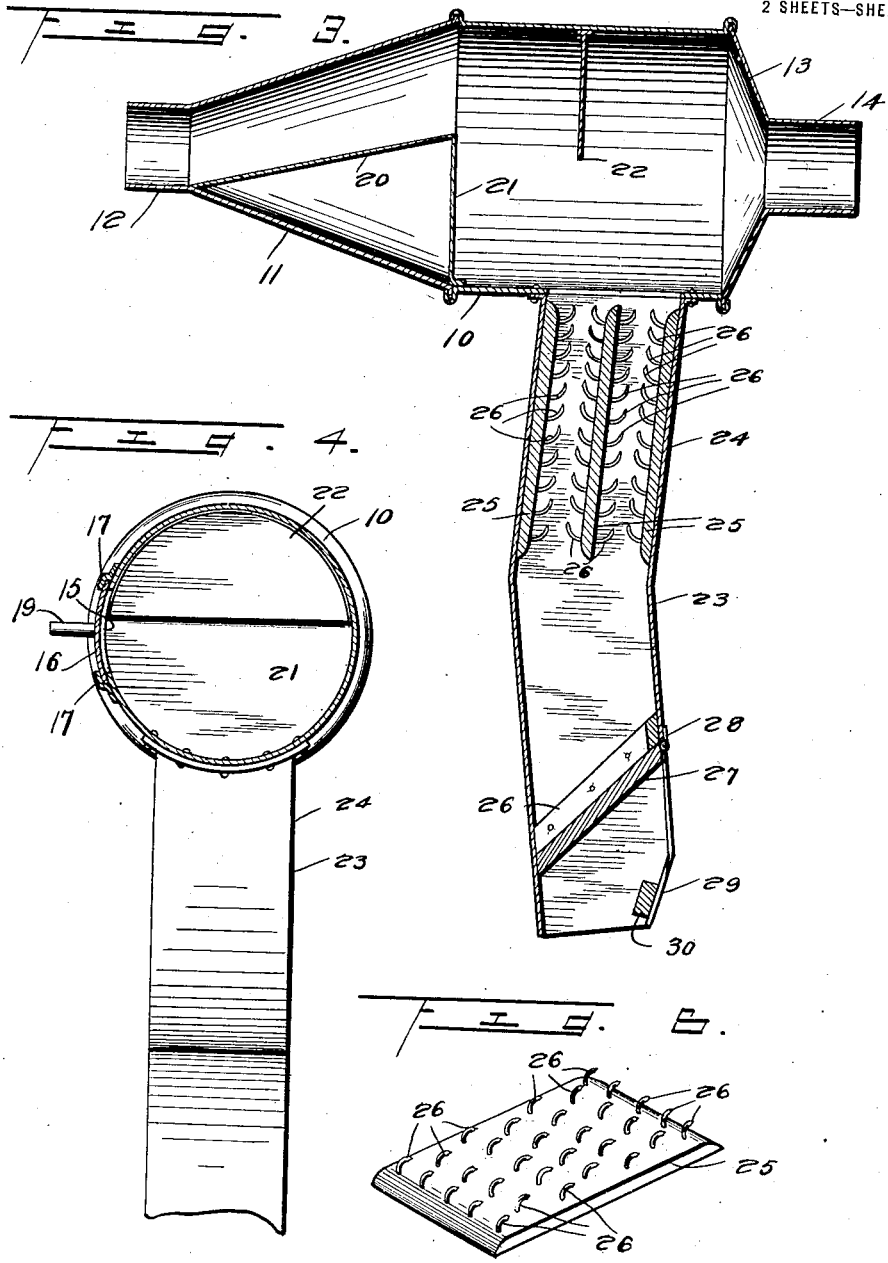

JOHN T. LAWRENCE, OF INMAN, SOUTH CAROLINA.

SEED-COTTON CULLER.

1,340,063.

Specification of Letters Patent.  Patented May 11, 1920.

Application filed July 16, 1919. Serial No. 311,269.

*To all whom it may concern:*

Be it known that I, JOHN T. LAWRENCE, a citizen of the United States, residing at Inman, in the county of Spartanburg and State of South Carolina, have invented certain new and useful Improvements in Seed-Cotton Cullers; and I do hereby declare the following to be a full, clear, and exact description of the invention, such as will enable others skilled in the art to which it appertains to make and use the same.

This invention relates to an improved seed cotton culler for use in connection with the inlet or suction pipe of a cotton gin through which the seed cotton is to pass on its way to the gin and the principal object of the invention is to provide a seed cotton culler so constructed that foreign substances such as nails, stones or the like may be effectively separated from the cotton and deposited in an outlet chute, a baffling structure being provided at the upper end of the refuse chute to prevent the cotton from passing down through the chute.

Another object of the invention is to so construct this culler that the seed cotton will enter the drum and be directed toward the upper portion thereof and then abruptly dropped toward the lower portion thereof, thereby permitting the foreign substances to be readily separated from the cotton.

Another object of the invention is to provide an improved construction at the outlet end of the drum forming the body of the culler whereby the cotton may be readily sucked out of the drum and the heavy foreign substances stopped and caused to drop into the outlet chute.

Another object of the invention is to provide an improved valve construction at the lower outer end portion of the outlet chute, the valve being so mounted that it will be held in a closed position by suction and to further so construct and mount this valve that it may readily drop to an open position when the suction is discontinued.

This invention is illustrated in the accompanying drawings, wherein:

Figure 1 is a view showing the improved seed cotton culler in side elevation.

Fig. 2 is a view showing the culler in end elevation.

Fig. 3 is a longitudinal sectional view through the culler.

Fig. 4 is a transverse sectional view through the culler taken along the line 4—4 of Fig. 1.

Fig. 5 is a perspective view of one of the baffle plates mounted in the upper portion of the refuse outlet chute.

This seed cotton culler is provided with a tubular body or drum 10 having a tapered end portion 11 terminating in an inlet neck 12 and is provided at its opposite end with a head 13 from the central portion of which extends an outlet neck 14. A side opening 15 is provided in this drum through which access may be had to the interior of the drum and in order to close this side opening there has been provided a sliding door 16 which is slidably connected with the drum and guided in its sliding movement by tracks 17. An abutment 18 is provided to limit sliding movement of the door and prevent the door from moving toward the head 13 beyond a desired amount and in order to permit easy movement of the door there has been provided an operating knob 19 positioned at one end of the door. Within the tapered end portion 11 of this drum is located an incline 20 extending inwardly and upwardly from the inlet neck 12 and terminating at its inner end in an abrupt depending supporting wall 21. Therefore there has been provided a direct drop from the inner end of the incline to the lower portion of the drum. A baffle 22 is provided in this drum 10 for engaging the cotton and refuse and directing the same toward the bottom portion of the drum when leaving the incline.

The outlet chute 23 for the refuse is positioned beneath the drum and provided with an inclined upper end portion 24 which extends forwardly of the vertically disposed lower end portion of the chute and has its upper end portion connected with the drum and inclosing an outlet opening formed in the lower portion of the drum adjacent the forward end thereof. Baffle plates 25 are positioned longitudinally in this inclined upper end portion of the outlet chute and carry teeth 26 positioned in rows and extending upwardly and curved as clearly shown in Figs. 3 and 5 so that cotton will be prevented from passing down through this chute but stones, nails and other similar refuse permitted to pass freely through the chute. In the lower portion of this chute there has been provided an abutment frame 26 which extends diagonally through the chute and serves as means for limiting upward movement of the closure door 27. This closure door 27 constitutes a swinging valve and the abutment frame constitutes a valve seat upon which the valve will seat to prevent air from passing up through the chute when a suction is created in the drum. The side wall of the chute with which the valve door is hingedly connected as shown at 28 is cut away beneath this door and the lower corner portions of the side walls are bent inwardly to provide ears 29 with which an abutment bar 30 is connected. This abutment bar 30 is provided to engage the door and limit downward swinging movement of the door beyond a desired amount.

When in use this culler will be positioned intermediate the length of the pipe leading from the feeding station to the gin and cotton passing to the gin will pass through the culler. This cotton will enter the culler through the inlet pipe 12 and will leave the culler through the outlet pipe 14. Upon entering the culler, the cotton will pass up through the tapered end portion of the drum along the inclined body and upon leaving the inner end of this incline will strike the baffle 22 and drop toward the bottom of the drum. The section in the drum will cause the relatively light cotton to move quickly through the drum and out through the outlet neck or pipe 14 whereas stones, nails and other similar refuse will drop to the bottom of the culler and the suction will draw this refuse toward the head 13. The principal portion of the refuse will immediately drop into the refuse chute but some of it will pass over the chute and will strike the head 13 below the outlet neck and will be thrown back by the force of the blow received and dropped into the refuse chute.

In the operation of a cotton gin the suction in the feed pipe is cut off at stated intervals and when this occurs the suction in the culler will be cut off and the valve door 27 will be released from the suction holding it in place. The door will then drop to the open position and the refuse which has accumulated in the lower portion of the chute will drop out. During the time the suction is cut off cotton might tend to pass into the refuse chute and in order to prevent this the baffle clearly disclosed in Fig. 3 has been provided. As soon as the suction is again created in the feed pipe of the gin, the door 27 will swing upwardly to the closed position and the cotton will be again carried through the drum and the refuse deposited in the refuse chute. It will thus be seen that there has been provided a culler in which the seed cotton will be very effectively separated from the heavy refuse and the clean cotton carried out through the cotton outlet and the refuse caused to pass into the refuse chute. In case it is necessary to have access to the interior of the drum for any purpose, this can be readily done by sliding the closure 16 to the open position. Any necessary repairs can be made through this opening or refuse which will not pass through the refuse chute may be removed through this opening.

What is claimed is:

1. A seed cotton culler comprising a drum having one end portion tapered and terminating in an inlet neck, a head at the opposite end of the drum having a centrally located outlet neck, an incline extending inwardly and upwardly from the outer end of the tapered portion of said drum to the inner end thereof, a baffle extending from the upper portion of the drum to a point below the level of the inner end of said incline, an outlet chute positioned beneath the drum and having an upper section extending forwardly at an incline and inclosing a refuse outlet in the lower portion of the drum, and baffling means in the inclined portion of the chute permitting refuse to pass through the chute and preventing cotton from passing through the chute.

2. A seed cotton culler comprising a drum having an inlet and an outlet located out of alinement, a depending baffle in the drum between the outlet and inlet and extending fully across the inlet and partially across the outlet, and a refuse chute communicating with the lower portion of the drum at a point intermediate the inlet and outlet.

3. A seed cotton culler comprising a drum having an inlet and an outlet, a refuse chute communicating with the lower portion of the drum, and baffle means positioned in the upper portion of the chute for preventing passage of cotton through the chute.

4. A seed cotton culler comprising a drum having an inlet and an outlet, a refuse chute communicating with the lower portion of the drum and having its upper portion inclined toward the outlet end of the drum, baffle plates extending longitudinally through the upper portion of the chute in spaced relation and provided with teeth extending upwardly from the baffle plates for engaging cotton and preventing passage of cotton through the chute, and a closure movably connected with the lower portion of the chute and releasably held in a closed position by suction in the drum.

5. A seed cotton culler comprising a drum having an inlet and an outlet, a refuse chute communicating with the lower portion of the drum, and baffle plates positioned in the upper portion of the chute and inclined toward the outlet end of the drum and provided with teeth for engaging cotton and preventing passage of the cotton through the chute.

6. A seed cotton culler comprising a drum having an inlet and an outlet, a refuse chute communicating with the lower portion of the drum at a point intermediate its length, the chute being open at its upper and lower ends, an abutment frame positioned in the lower portion of the chute and constituting a valve seat, a closure door hingedly mounted for swinging movement into and out of engagement with the abutment frame and constituting a valve for seating upon the valve seat when the valve is held in a closed position by suction in the drum, and baffle means in the upper portion of the chute permitting refuse to pass into the chute and preventing cotton from passing into the chute.

7. A seed cotton culler comprising a drum having an inlet and an outlet, a refuse chute communicating with the lower portion of the drum at a point intermediate its length and adjacent the outlet end of the drum, the chute being open at its upper and lower ends and having one wall cut away adjacent the lower end and having opposite walls bent to provide inwardly extending ears, an abutment bar connected with the ears and extending across the open side of the chute, an abutment frame positioned in the lower portion of the chute and constituting a valve seat, and a closure hingedly mounted and limited in downward swinging movement through engagement with the bar and seating upon the valve seat when swung upwardly to a closed position through the action of suction in the drum.

In testimony whereof I affix my signature in presence of two witnesses.

JOHN T. LAWRENCE.

Witnesses:
J. H. ROTHROCK,
NELLIE CULP.